US008543696B1

(12) United States Patent
Williamson

(10) Patent No.: US 8,543,696 B1
(45) Date of Patent: Sep. 24, 2013

(54) NETWORK ACCESS

(71) Applicant: AppSense Limited, Cheshire (GB)

(72) Inventor: Mark Williamson, Whitefield (GB)

(73) Assignee: AppSense Limited, Daresbury, Warrington (GB)

( * ) Notice: Subject to any disclaimer, the term of this patent is extended or adjusted under 35 U.S.C. 154(b) by 0 days.

(21) Appl. No.: 13/633,349

(22) Filed: Oct. 2, 2012

(51) Int. Cl.
*G06F 15/173* (2006.01)
*G06F 17/00* (2006.01)

(52) U.S. Cl.
USPC ............................. 709/224; 709/225; 726/15

(58) Field of Classification Search
USPC .................................... 709/224, 225; 726/15
See application file for complete search history.

(56) References Cited

U.S. PATENT DOCUMENTS

| 6,321,337 | B1* | 11/2001 | Reshef et al. | 726/14 |
|---|---|---|---|---|
| 6,640,302 | B1* | 10/2003 | Subramaniam et al. | 713/169 |
| 7,089,426 | B1* | 8/2006 | Bagshaw | 713/193 |
| 7,903,671 | B2* | 3/2011 | Brahmbhatt et al. | 370/401 |
| 2002/0103857 | A1* | 8/2002 | Soderberg et al. | 709/203 |
| 2006/0101510 | A1* | 5/2006 | Kadyk et al. | 726/12 |
| 2009/0260007 | A1* | 10/2009 | Beaty et al. | 718/1 |
| 2012/0054744 | A1* | 3/2012 | Singh et al. | 718/1 |

* cited by examiner

*Primary Examiner* — Aaron Strange

(57) ABSTRACT

Disclosed is a method of administering an access policy during a virtual desktop session including steps of: determining open inbound connection information; determining current open outbound connection information; and evaluating an access policy, wherein the open inbound and outbound connection information are assessed to determine whether the open inbound connection is from an insecure environment and the open outbound connection is to a protected web page or resource only accessible to a connection from a secure environment, whereby if it is so determined, the open outbound connection is disconnected or redirected to a second web page or resource accessible to a connection from the insecure environment in accordance with the access policy.

20 Claims, 5 Drawing Sheets

NETWORK ACCESS

FIELD OF THE INVENTION

The present invention concerns the provision of controlled access to a web page or other networked resources. Embodiments of the invention find particular, but not exclusive use, in the area known as remote desktop access. This is related to the growing phenomenon of staff using computing devices including portable computing device(s) for work-related activities via remote desktop access.

BACKGROUND

It is now relatively common for employees to work on their employer's business using their own devices. Such devices can include portable devices such as laptop computers, netbook computers, tablet computers (such as the Apple® iPad®) and smartphones. However, although use of such devices can be convenient to both the employee and the employer, their use can create security vulnerabilities, since the employer is not in ultimate control of the devices and is unable to fully implement security and/or access policies.

Corporations often use applications to allow access to business critical data. Users can access these applications running directly or via Virtual Desktop Infrastructure (VDI) or Remote Desktop Services (RDS) sessions, henceforth referred to as a virtual desktop, from almost any device anywhere, provided a suitable network connection is available. This may present a problem to corporations in terms of control and security of their business information when users use virtual desktops from portable devices, since the data may be more susceptible to being compromised by technological means e.g. packet sniffing. Also, simple visual interception (known as shoulder surfing) can be a problem, whereby sensitive data can simply be observed by third parties on the screen of the user's device.

It is an aim of embodiments of the present invention to permit the application of an access policy, which takes into account a number of different conditions to allow, block or redirect access to certain resources or web pages on the basis of the evaluation of these conditions.

SUMMARY

According to the present invention there is provided an apparatus and method as set forth in the appended claims. Other features of the invention will be apparent from the dependent claims, and the description which follows.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION

Figure 1:
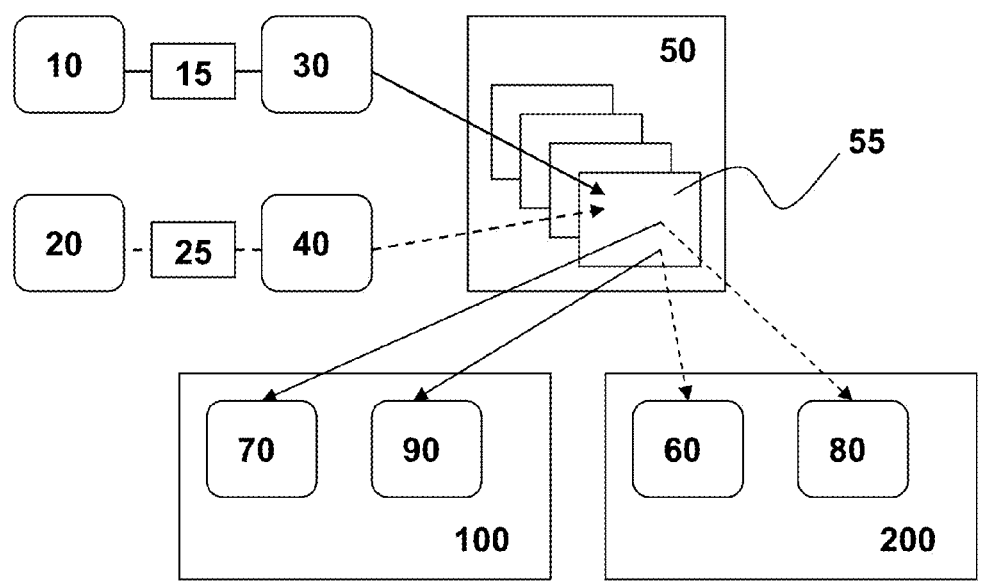
FIG. 1 shows a user connecting from a secure and/or insecure environment with an access policy being implemented according to an embodiment of the present invention.

FIG. 1 shows a user connecting from a secure environment 10 using a first protocol 15 and a user connecting from an insecure environment 20 using a second protocol 25 to a data center 50 whereon virtual desktop sessions reside. The user connects to a virtual desktop session 55 via a first server 30, assigned to connections from a secure environment 10, or a second server 40, assigned to connections from an insecure environment 20. The first server has an Internet Protocol (IP) address of IP_A and the second server has an IP address of IP_B.

The user's virtual desktop session 55 has first open outbound connection/port to a protected resource or web page 70, 90 on a networked resource intended for the secure environment 100 and/or second open outbound connection/port to a resource or web page 60, 80 on a networked resource intended for the insecure environment 200. The resource may be a storage device or any other type of medium for storing or supplying data. The resource or the web page 70, 90 may include business critical data or any other sensitive information.

Although in FIG. 1 the networked resources are connected to the virtual desktop session 55 via a network connection, it is understood that the networked resources 100, 200 may reside inside the data center or the server whereon an instance of the user's virtual desktop session 55 is running.

The user is in possession of a device for accessing a remote network. The device may be any form of computing device. In the following description, attention will be focussed on a portable computing device such as a laptop computer or tablet computer, but this is not intended to be limiting.

In the following description, attention will be focussed on an access policy according to an embodiment of the present invention wherein the access policy runs on a virtual desktop session 55 whereto the user establishes a connection and wherefrom the user seeks access to a resource or a web page 60, 70, 80, 90, but this is not intended to be limiting. It is understood that the access policy may be run on other platforms or devices, such as the user's portable computing device, with appropriate configuration changes and the access may be sought to other types of resources whereon critical data may reside.

Figure 2:
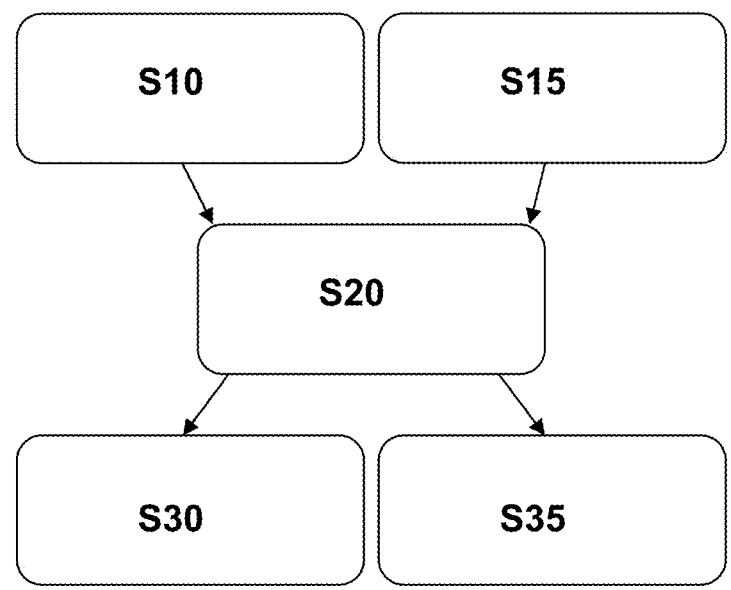
FIG. 2 shows a method for administering an access policy according to an embodiment of the present invention.

FIG. 2 shows a method for administering an access policy according to an embodiment of the present invention wherein the method includes the steps of: determining open inbound connection information; determining current open outbound connection information; and assessing/identifying any access policy breach. The open inbound connection information includes a connection type used, connection port or network address assigned to a device involved in the open inbound connection. The open outbound connection information includes a URL to a web page, a connection port/network address to a resource, or any other information used for establishing a connection to a resource or a web page. Standard commands such as "netstat -an" in the Windows® command prompt environment or "GetExtendedTcpTable( )" function may be used to obtain the inbound and/or outbound connection information. The method may also include a step of disconnecting and/or redirecting an access policy breaching outbound connection.

The method of FIG. 2 will now be described with reference to an embodiment shown in FIG. 1.

At step S10, an open inbound connection type 15, 25, such as protocol used for the inbound connection to the virtual desktop session 55 from the user's laptop, is determined. Depending on an implementation of a Virtual Desktop Infrastructure (VDI) or Remote Desktop Services (RDS) system, a different protocol may be used depending on from where the laptop's connection is initiated, that is depending on whether the user's connection is from a secure or an insecure environment 10, 20.

According to an embodiment, when the laptop connects to a data center 50 from a secure environment 10, from a location inside a corporation's premises for example, Microsoft® Remote Desktop Protocol (RDP) 15 is used for connecting to the virtual desktop session 55, while when the laptop connects from an insecure environment 20, outside the corporation's premises for example, only Citrix® Independent Computing Architecture (ICA) 25 is used for the connection to the virtual desktop session 55. Therefore the laptop's location can be determined from the protocol used for the inbound communication 15, 25, whereby a decision can be made whether the inbound connection is from a secure environment 100 or an insecure environment 200.

In such an embodiment, WTSQuerySessionInformation( ) function could be used to retrieve a Windows Station Name, the value of which changes depending on the connection type or protocol used. For example, if the laptop connects via RDP 15 the Windows Station Name may be RDP-Tcp and if the laptop connections via ICA 25 the Windows Station Name may be ICA-Tcp. It is then possible to determine the laptop's location from the retrieved protocol used for the inbound communication 15, 25.

At step S15, an open inbound connection port and/or a network address of a device involved in the open inbound connection is determined. Such device may be a server 30, 40 connected to the laptop via the inbound connection. A different server may be used in accordance with wherefrom the laptop's connection is initiated, that is whether the user's connection is from a secure or an insecure environment 10, 20.

According to an embodiment, when the laptop connects to a data center 50 from a secure environment 10, from a location inside a corporation's premises for example, a first Citrix® server 30 is used for connecting to the virtual desktop session 55, while when the laptop connects from an insecure environment 20, outside the corporation's premises for example, a second Citrix® server 40 is used for the connection to the virtual desktop session 55. The first server 30 has an IP address of IP_A and uses a first connection port Port_A and the second server 40 has an IP address of IP_B and uses a second connection port Port_B. Therefore the laptop's location can be determined from the IP address of and/or connection port used by the server 30, 40 involved in the inbound communication, whereby a decision can be made whether the inbound connection is from a secure environment 100 or an insecure environment 200.

In an alternative embodiment, only one of steps S10 and S15 will take place if only one of step S10 or S15 is sufficient in making such determination. It is understood that in an embodiment where a user may be able to connect to either of the first or second server 30, 40 regardless of whether he/she is connecting from a secure or insecure environment 10, only step S10 may take place, and in an embodiment where any protocol 15, 25 can be used for the open inbound connections, only step S15 may take place.

It is also understood that similar secure or insecure environment 10, 20 determination can be made of the laptop's inbound connection's initiating location, whether the location relates to a physical or virtual location, as long as there is an interdependence between the location and the connection type 15, 25, port and/or network address of the device 30, 40.

At step S20, a current open outbound connection from the virtual desktop session 55 is determined. This step S20 determines the user's connections to a resource or web page 70, 90 on a networked resource intended for a secure environment 100 and/or a resource or web page 60, 80 on a networked resource intended for an insecure environment 200. This determination of outbound connection can be made by identifying open outbound connection ports and/or IP addresses from the virtual desktop session 55 or by identifying URLs opened by a browser. When the browser used is Microsoft® Internet Explorer®, a Browser Helper Object (BHO) may be used to identify the open outbound connection ports and/or URLs currently accessed.

According to an embodiment, the user's virtual desktop session 55 has a first open outbound connection/port to a protected resource or web page 70, 90 on a networked resource intended for a secure environment 100 and/or second open outbound connection/port to a resource or web page 60, 80 on a networked resource intended for an insecure environment 200. The resource may be a storage device or any other type of medium for storing or supplying data. The resource or the web page 70, 90 may comprise business critical data or any other security sensitive information. At step S20, the first and/or second outbound connection/port is determined.

In such an embodiment, a BHO calls "GetExtendedTcpTable( )" function and retrieves a first list of open outbound connections/ports and compares this first list to a second list of connections/ports/IP addresses to resources or web pages 70, 90 on a networked resource intended for a secure environment 100, whereby a first open outbound connection/port can be determined. The second list is stored in an xml file which may be stored in the virtual desktop session 55, the data center 50 or the laptop. An exemplary xml comprising the second list would be:

<RestrictedAddresses_NAME="BlockedAddresses">
<BlockedAddress IP="2.2.2.2" Port="20" />
</RestrictedAddresses>

Internet Explorer® reads data from this xml file and compares the second list extracted from the read data to the first list retrieved using "GetExtendedTcpTable( )" function. If a match is found between the items of the first and second list, the connection/port/IP address matched is either blocked or redirected in accordance with step S30 or S35.

At step S30 or S35, the determinations made in steps S10, S15 and S20 are used to administer an access policy wherein any access policy breach is assessed and identified. Once policy breach is identified, a further step of blocking or redirecting the breaching open outbound connection may be taken.

According to an embodiment, when the inbound connection is determined to be from a first laptop in the secure environment 10, the access policy permits the first laptop's virtual desktop session 55 to have access via both first open outbound connection/port to the protected resource or web page 70, 90 on the networked resource intended for the secure environment 100 and second open outbound connection/port to the resource or web page 60, 80 on the networked resource intended for the insecure environment 200. Therefore if it is determined that either of the first and second outbound connections is open on the virtual desktop session 55 of the first laptop, step S30 is taken wherein both first and second outbound connections are retained in their current state.

However, when the inbound connection is determined to be from a second laptop in the insecure environment 20, the access policy permits the second laptop's virtual desktop session 55 to have access via only the second open outbound connection/port to the resource or web page 60, 80 on the networked resource intended for the insecure environment 200. Therefore if it is determined that the first outbound connection is open on the virtual desktop session 55 of the second laptop, step S35 is taken wherein the first outbound connection is disconnected. It is understood that when the first outbound connection is disconnected, the access policy may also display a notification or a warning message.

According to an embodiment, the step S35 may also include redirecting the first outbound connection to at least one of the second outbound connection according the access policy. For example, if a browser running on the second laptop had a URL for a protected web page 70, 90 on the networked resource intended for the secure environment 100 open, this URL will be redirected by the access policy to another web page 60, 80 on the networked resource intended for the insecure environment 200. This redirected web page may also display a warning or a notification notifying a breach of access policy or a denial of access. A Browser Helper Object (BHO) using IWebBrowser2 interface can be used to access Internet Explorer®'s Navigate( )method to redirect such a URL.

The method of FIG. 2 determines the connection type used 15, 25, such as protocol, and/or open inbound connections and ports 30, 40 used by the user to connect to the virtual desktop session 55, whereby the access policy is able to obtain additional information about the user and his/her virtual desktop session. Typically, this additional information relates to whether the user is connected to the virtual desktop 55 via a secure connection and/or from a secure environment 10 or via an insecure connection and/or from an insecure environment 20. Then the access policy, using the additional information, restricts access from the user's virtual desktop 55 to specific resources 70, 90, whereon the protected business critical data resides.

Figure 3:
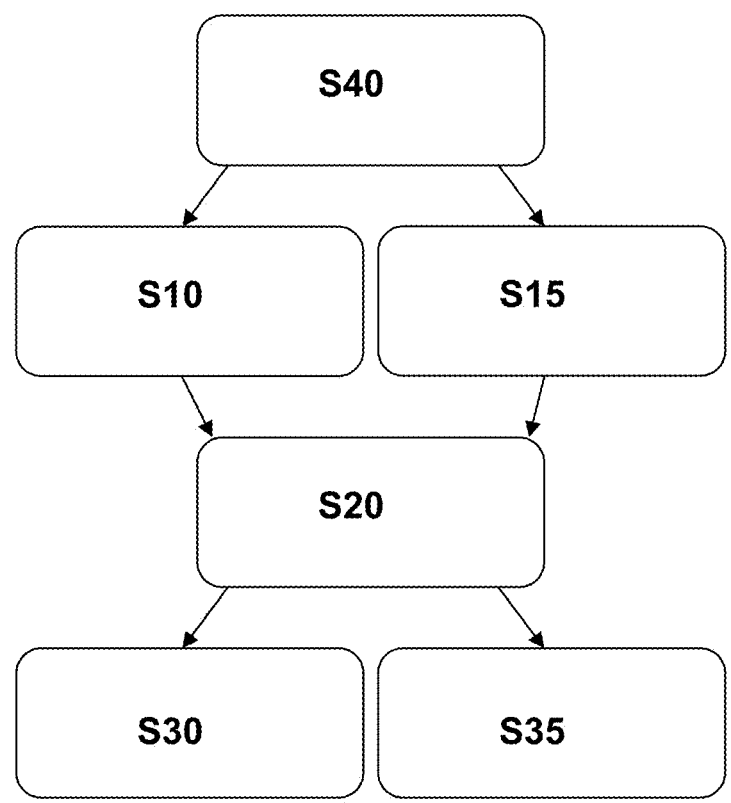
FIG. 3 shows a method for administering an access policy according to another embodiment of the present invention.

FIG. 3 shows a method for administering an access policy according to another embodiment of the present invention wherein a step S40 has been added to the method of FIG. 2.

At step S40, a determination is made to see if an inbound connection to the virtual desktop session 55 has been re-established. This step includes performing an inbound connection check, wherein the check may be performed randomly, periodically at regular time intervals, whenever an inbound connection is requested, whenever an inbound connection type is changed, whenever an outbound connection is requested, whenever the virtual desktop session 55 exits a stand-by/suspension mode, or whenever any other type of change in state is observed.

According to an embodiment, the method of FIG. 3 includes step S40 wherein an inbound connection check is performed whenever a laptop establishes a connection to the virtual desktop session 55. For example, if the laptop was connected to the virtual desktop session 55 but then suspends the session and reconnects from a different location, step S40 detects this reconnection and performs a check and/or determination step on the inbound connection according to aforementioned step S10 and/or S15 as described for the method of FIG. 2.

If the location of the laptop has changed, steps S20, S30, and/or S35 are also performed whereby any currently open outbound connection is also re-assessed for its adherence to the access policy and the access policy administered accordingly as described for the method of FIG. 2. For example, WtsWaitsystemEvent function can be used in the BHO running in the Internet Explorer® so that the BHO can be alerted of any reconnection, which may be due to a change in the location of the laptop, whereby the BHO re-assesses any currently open outbound connection for its adherence to the access policy when such a change in location occurs.

It is understood that the access policy may also be user or group dependent. For example, an administrator with a high level of privilege may be allowed access through any outbound connection to any protected resource regardless of his or her location while a normal user may only have a restricted access dependent on his or her location. Further, different groups of users may be assigned various levels of privileges, whereby each group's access policy and the level of access restriction applied to each member of the group may be varied accordingly.

Figure 4:
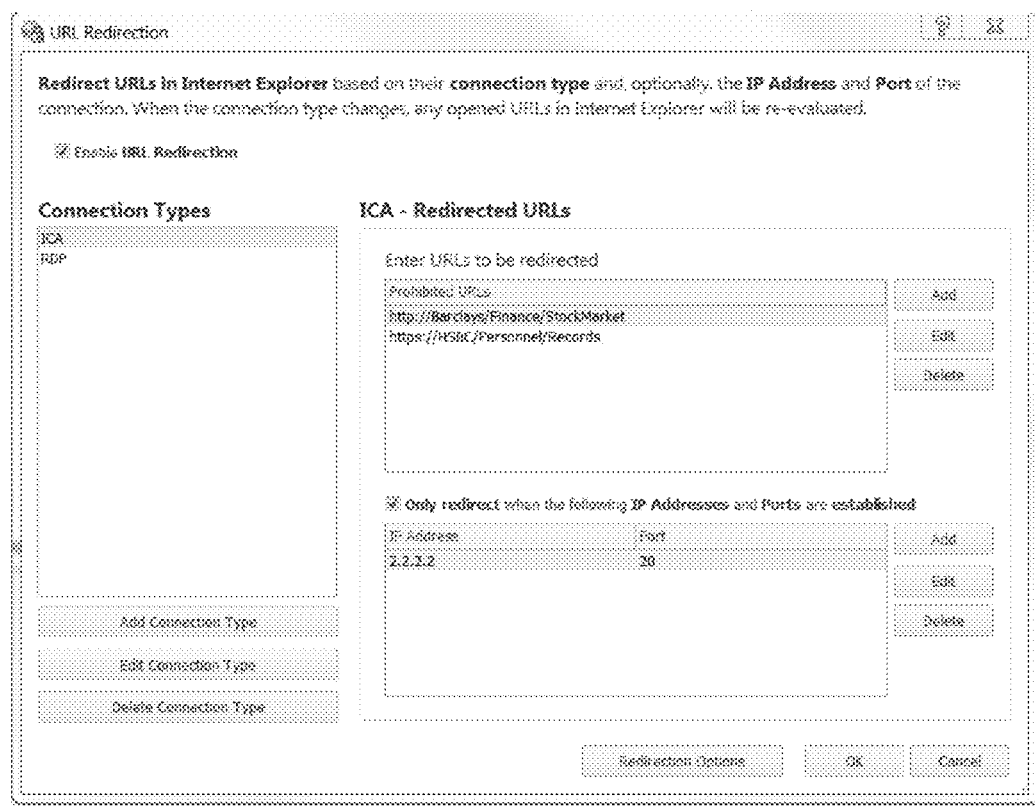
FIG. 4 shows a User Interface (UI) for administering an access policy according to an embodiment of the present invention.

FIG. 4 shows a User Interface (UI) for administering an access policy according to an embodiment of the present invention. According to an embodiment, using such UI, an access policy administrator can define a connection type and whether the defined connection type is associated with a secure environment 10 or an insecure environment, define a URL to be redirected and a second URL for the redirection to redirected to, switch on or off a URL redirection, and/or define an inbound connection port or IP address for a server associated with a secure environment 10 or an insecure environment. In this embodiment, the URL to be redirected is an example of the first open outbound connection described for step S35 of the method of FIG. 2 or 3.

Figure 5:
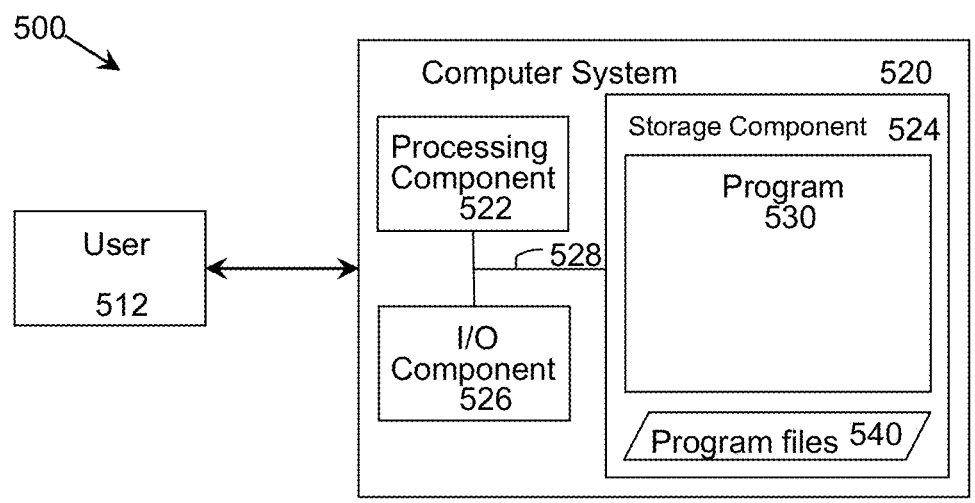
FIG. 5 shows a computer system configured to perform embodiments of the present invention.

FIG. 5 shows an illustrative environment 510 according to an embodiment of the invention. The skilled person will realise and understand that embodiments of the present invention may be implemented using any suitable computer system, and the example system shown in FIG. 5 is exemplary only and provided for the purposes of completeness only. To this extent, the data center 50 of FIG. 1 includes the environment 510 which includes a computer system 520 that can perform a process or method described herein in order to perform an embodiment of the invention. In particular, computer system 520 is shown including a program 530, which makes computer system 520 operable to implement an embodiment of the invention by performing a process or method described herein.

Computer system 520 is shown including a processing component 522 (e.g., one or more processors), a storage component 524 (e.g., a storage hierarchy), an input/output (I/O) component 526 (e.g., one or more I/O interfaces and/or devices), and a communications pathway 528. In general, processing component 522 executes program code, such as program 530, which is at least partially fixed in storage component 524. While executing program code, processing component 522 can process data, which can result in reading and/or writing transformed data from/to storage component 524 and/or I/O component 526 for further processing. Pathway 528 provides a communications link between each of the components in computer system 520. I/O component 526 can comprise one or more human I/O devices, which enable a human user 512 to interact with computer system 520 and/or one or more communications devices to enable a system user 512 to communicate with computer system 520 using any type of communications link. To this extent, program 530 can manage a set of interfaces (e.g., graphical user interface(s), application program interface, and/or the like) that enable human and/or system users 512 to interact with program 530. Further, program 530 can manage (e.g., store, retrieve, create, manipulate, organize, present, etc.) the data, such as a plurality of data files 540, using any solution.

In any event, computer system 520 can comprise one or more general purpose computing articles of manufacture (e.g., computing devices) capable of executing program code, such as program 530, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, program 530 can be embodied as any combination of system software and/or application software.

Further, program 530 can be implemented using a set of modules. In this case, a module can enable computer system 520 to perform a set of tasks used by program 530, and can be separately developed and/or implemented apart from other portions of program 530. As used herein, the term "component" means any configuration of hardware, with or without software, which implements the functionality described in conjunction therewith using any solution, while the term "module" means program code that enables a computer system 520 to implement the actions described in conjunction therewith using any solution. When fixed in a storage component 524 of a computer system 520 that includes a processing component 522, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 520.

When computer system 520 comprises multiple computing devices, each computing device can have only a portion of program 530 fixed thereon (e.g., one or more modules). However, it is understood that computer system 520 and program 530 are only representative of various possible equivalent computer systems that may perform a process described herein. To this extent, in other embodiments, the functionality provided by computer system 520 and program 530 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 520 includes multiple computing devices, the computing devices can communicate over any type of communications link. Further, while performing a process described herein, computer system 520 can communicate with one or more other computer systems using any type of communications link. In either case, the communications link can comprise any combination of various types of optical fibre, wired, and/or wireless links; comprise any combination of one or more types of networks; and/or utilize any combination of various types of transmission techniques and protocols.

In any event, computer system 520 can obtain data from files 540 using any solution. For example, computer system 520 can generate and/or be used to generate data files 540, retrieve data from files 540, which may be stored in one or more data stores, receive data from files 540 from another system, and/or the like.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not comprise transitory propagating signals (e.g., a propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages and/or other development tools.

While various embodiments have been described above, it should be understood that they have been presented by way of example only, and not limitation, and as such, various changes in form and/or detail may be made. Any portion of the apparatus and/or methods described herein may be combined in any suitable combination, unless explicitly expressed otherwise. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method, comprising:
monitoring an open inbound connection from a computing device to a virtual desktop session to define open inbound connection information relating to the open inbound connection, the open inbound connection information including a connection type used for connecting the computing device to the virtual desktop session, or a connection port or network address assigned to a server providing the open inbound connection;
monitoring an open outbound connection from the virtual desktop session to define open outbound connection information relating to the open outbound connection, the open outbound connection information including a Uniform Resource Locator (URL), or a connection port or network address to a resource;
evaluating the open inbound connection information and the open outbound connection information based, at least in part, on an access policy to determine whether (1) the open inbound connection is from an insecure environment and (2) the open outbound connection is to a protected web page or resource accessible from a secure environment; and
redirecting the open outbound connection to an unprotected web page or resource accessible from the insecure environment in accordance with the access policy, if the open inbound connection is from the insecure environment and the open outbound connection is to a protected web page or resource accessible from the secure environment.

2. The method of claim 1, further comprising detecting a change in the connection type used for connecting the computing device to the virtual desktop session.

3. The method of claim 2, wherein the evaluating is performed in response to detecting the change in the connection type.

4. The method of claim 1, further comprising detecting a change in the connection port or network address assigned to the server providing the inbound connection.

5. The method of claim 4, wherein the evaluating is performed in response to detecting the change in the connection port or network address.

6. The method of claim 1, further comprising detecting a change in the open inbound connection in response to a change in a state of the virtual desktop session, the state of the virtual desktop session including a suspension or stand-by mode.

7. The method of claim 6, wherein the evaluating is performed in response to detecting the change in the open inbound connection.

8. The method of claim 1, further comprising:
determining a location of the computing device based on the open inbound connection information and to be either in the secure environment or in the insecure environment,
the evaluating being based on the location of the computing device.

9. The method of claim 1, wherein:
the secure environment includes a first network of computing devices implementing a predetermined access policy; and
the insecure environment includes a second network of computing devices not implementing the predetermined access policy.

10. The method of claim 1, wherein:
the secure environment includes a first network of devices located inside a predetermined physical boundary; and
the insecure environment includes a second network of devices located outside a predetermined physical boundary.

11. The method of claim 1, further comprising:
classifying the computing device as being insecure based on at least one open inbound connection from the computing device being from the insecure environment.

12. The method of claim 1, wherein the open inbound connection is from a plurality of open inbound connections, the monitoring includes monitoring each open inbound connection from the plurality of open inbound connections.

13. A computer system, comprising:
a first computing device having at least one of a memory and a processor; and
a second computing device having at least one of a memory and a processor,
the first computing device is configured to establish an inbound connection to the second computing device from an insecure environment,
the second computing device is configured to establish the inbound connection with the first computing device and provide a virtual desktop session for the first computing device,
the first computing device is configured to establish an outbound connection from the virtual desktop session to a protected resource or Uniform Resource Locator (URL) intended for a secure environment,
the second computing device is configured to determine that the inbound connection is from the insecure environment,
the second computing device is configured, to disconnect the outbound connection to the protected resource, based on the inbound connection being from the insecure environment.

14. The computer system of claim 13, wherein the outbound connection is a first outbound connection, the second computing device is configured to establish a second outbound connection when the first outbound connection is disconnected, the second computing device configured to redirect data for the first outbound connection to the second outbound connection.

15. A method, comprising:
monitoring an open inbound connection from a computing device to a virtual desktop session to define open inbound connection information relating to the open inbound connection, the open inbound connection information including a connection type used for connecting the computing device to the virtual desktop session, or a connection port or network address assigned to a server providing the open inbound connection;
monitoring an open outbound connection from the virtual desktop session to define open outbound connection information relating to the open outbound connection, the open outbound connection information including a Uniform Resource Locator (URL), or a connection port or network address to a resource; and
selecting an access policy from a plurality of access policies based, at least in part, on a connection protocol associated with the open inbound connection;
determining an allowed level of access for the virtual desktop session based, at least in part, on the access policy; and
disallowing access from the virtual desktop session to a secure resource based, at least in part, on the allowed level of access.

16. The method of claim 15, wherein the connection protocol is based on the virtual desktop session being implemented as, at least one of, a Virtual Desktop Infrastructure (VDI) session or a Remote Desktop Services (RDS) session.

17. The method of claim 15, wherein the open inbound connection is from a plurality of open inbound connections, the method further comprising:
    classifying the computing device as being from an insecure environment based on at least one open inbound connection from the plurality of open inbound connections being from the insecure environment.

18. The method of claim 15, further comprising detecting a change in the open inbound connection, in response to a change in the connection protocol, the selecting being in response to the detecting.

19. The method of claim 15, further comprising:
    determining a location of the computing device based on the open inbound connection information to be either in a secure environment or in an insecure environment, the selecting being based on the location of the computing device.

20. The method of claim 18, wherein:
    the secure environment includes a first network of computing devices implementing a predetermined access policy; and
    the insecure environment includes a second network of computing devices not implementing the predetermined access policy.

* * * * *